United States Patent [19]
Dieter

[11] Patent Number: 5,494,583
[45] Date of Patent: Feb. 27, 1996

[54] METHOD FOR REMOVING DISSOLVED IMPURITIES FROM WATER

[76] Inventor: James R. Dieter, 10 NW. Pass, Oswego, Ill. 60543

[21] Appl. No.: 216,345

[22] Filed: Mar. 23, 1994

[51] Int. Cl.⁶ .................................................. C02F 1/72
[52] U.S. Cl. ...................... 210/721; 210/722; 210/738; 210/758; 210/916
[58] Field of Search ..................................... 210/721, 722, 210/738, 758, 916

[56] References Cited

U.S. PATENT DOCUMENTS

| | | | |
|---|---|---|---|
| 4,780,215 | 10/1988 | Carlson | 210/722 |
| 5,080,805 | 1/1992 | Houser | 210/722 |
| 5,096,580 | 3/1992 | Auchincloss | 210/722 |

FOREIGN PATENT DOCUMENTS 0133886  8/1983  Japan ..................................... 210/738

*Primary Examiner*—Neil McCarthy
*Attorney, Agent, or Firm*—Knechtel, Demeur & Samlan

[57] ABSTRACT

A method of removing dissolved iron or sulfur from water comprising the steps of pumping water containing the dissolved impurities through a conduit. Air is added to the water and is thoroughly and intimately mixed with the water in a closed mixing container. The iron or sulfur is chemically reacted with the oxygen to form a filterable precipitate which is filtered from the water.

9 Claims, 1 Drawing Sheet

METHOD FOR REMOVING DISSOLVED IMPURITIES FROM WATER

BACKGROUND AND SUMMARY OF THE INVENTION

This invention relates to a method and apparatus for removing dissolved impurities from water without adding chemicals.

Many natural water sources contain dissolved impurities. Well water often contains dissolved iron and sulfur. These are objectionable because they discolor clothing when used for washing and have objectionable taste and smell. Thus, these impurities should be removed before the water is used.

In the past, the most common method of removing suspended impurities from water has been either of two processes. The first is to merely allow the impurities to settle out of the water in settling tanks. The sediment settles at the bottom and is removed. A second method is to merely filter the water through a filter bed. Both of these systems are effective for the removal of larger suspended impurities. However, neither work for the removal of dissolved impurities. Usually, dissolved impurities require the addition of chemicals in order to form a precipitate which can then be removed. A disadvantage of this is that it requires the addition of chemicals which can be expensive and may not be environmentally friendly. Furthermore, the addition of chemicals can have adverse effects on the water which we are trying to purify. The chemicals themselves which are added must also be removed in addition to the suspended or dissolved impurities.

Applicant's invention overcomes many of these problems. No chemicals are added to the water. The only additive is air which is intimately mixed with the impure water. The oxygen in the air chemically reacts with the impurities to cause a filterable particulate. Thus, additional chemicals need not be purchased resulting in cost savings. Also, as chemicals are not added to the water, they do not need to be removed by filtering or other chemical removal processes.

Applicant's invention is very simple in operation which results in substantial cost savings. The impure water first has ambient air added to it by means of an air injector. The water is fed into a mixing device which causes a very thorough mixing of the water and air. This very violent mixing breaks the air bubbles into very small sizes and causes an intimate mixing of the air with the water. A chemical reaction occurs between the oxygen and the dissolved impurities to form a filterable particulate. The water is then fed into a storage or separator tank where it passes through a filter medium which removes the particulate. The clean water is then drawn from the storage tank for use.

Thus, it is an object of the present invention to provide a system for the removal of impurities from water by the addition of only air and does not require the addition of chemicals to remove the impurities. It is a related object to provide a water purification system which very intimately mixes air into the impure water to form a particulate which can be filtered.

Still, another object is the object of providing a water purification system which is extremely economical in operation and construction and which utilizes a minimum number of moving parts.

These and other objects will become apparent upon reading the brief description of the drawings and detailed description of the preferred embodiment.

DETAILED DESCRIPTION OF THE PREFERRED EMBODIMENT

Figure 1:
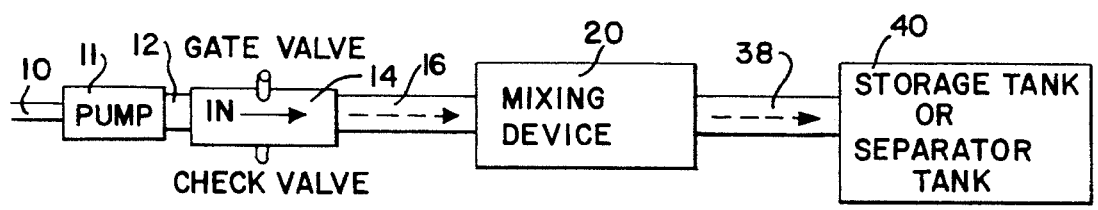
FIG. 1 is a schematic diagram showing the flow of water through the purification system.
Figure 2:
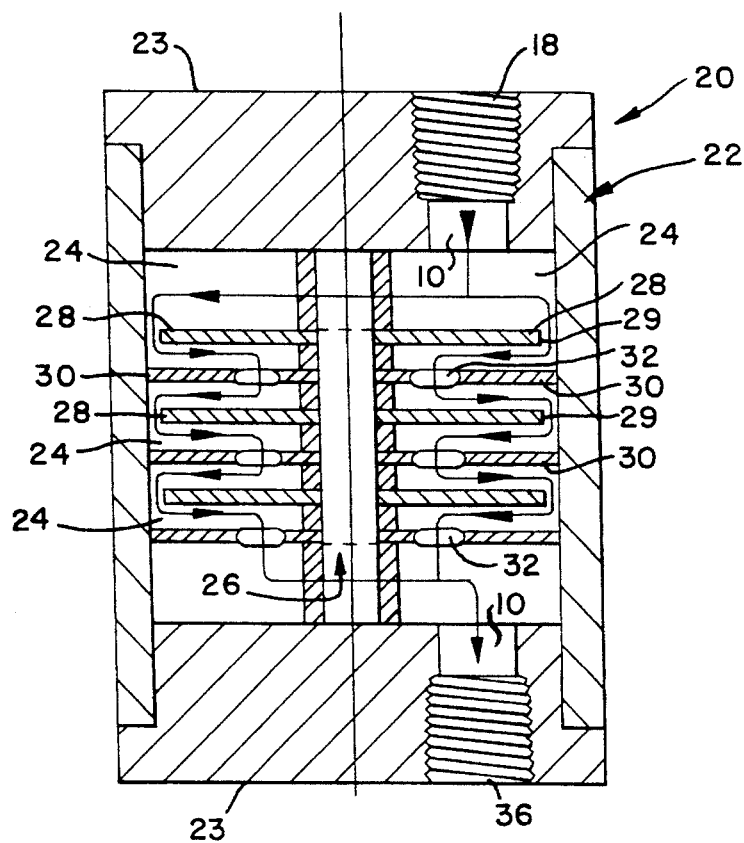
FIG. 2 is a cross-sectional view of the mixing device which intimately mixes the air and impure water.

Turning first to FIG. 1, there is illustrated a schematic of the overall inventive system. Impure water 10 containing sulfur and/or iron is pumped into the system by means of a conventional water pump or well pump 11 or the impure water can be supplied via a pressurized municipal water supply system. The water 10 is pumped into a conduit such as a hose or pipe 12. An aerator, oxygenator or air injector 14 supplies air to the water. The oxygenator is of a standard design and is commonly known in the art. Alternatively, the oxygenator 14 can be a pressurized device which forces air into the water. The preferable method is to use an oxygenator which merely draws air into it by means of a venturi principle due to the flow of water. Thus, additional pumping or components which can wear down or break are eliminated.

The water 10 is then forced out of the oxygenator 14 and into a second conduit 16. The conduit 16 is screwed into an inlet 18 of a mixing device 20. The mixing device 20 has a cylindrical outer wall 22 and opposite ends 23. The water enters the inlet 18, and passes into an inlet chamber 24. The flow of water is restricted by means of a plurality of baffles and wall restricter plates which redirect the water radially out towards the outer wall 22 and then back towards a center shaft 26. As the water enters the chamber 24, it is redirected radially outward by baffle plates 28. There is a small gap 29 of between 0.025 to 0.250 inches dependent on flow requirements between the baffle 28 and the outer wall 22. As the gap 29 is very small, the water as it is forced through the gap 29 increases in velocity. This thoroughly agitates and mixes the water and air. The water, after passing around the baffle 28, goes into a subsequent mixing chamber 24 where it is redirected by means of wall restricter plate 30 radially from the outer wall 22 towards the center shaft 26. Plate 30 has its outer edge attached to the outer wall 22 so that the water cannot pass between the edge and wall 22. There is an opening 32 formed in the plate 30 near the center shaft 26. The water 10 flows through this opening 32 and into the next mixing chamber 24. Another baffle 34 redirects the water 10 back towards the outer wall 22.

The alternating baffles and wall plates cause the water to flow up and back from the center of the mixing device to the outer wall. As the water flows through this convoluted passageway, it is thoroughly mixed with the air. The air bubbles are broken down into bubbles of diameter of less than ⅛ inch to microscopic sizes and thoroughly mixed with the water. The water then exits the mixing device 20 through an outlet 36. The extremely small bubble size and high shear mixing of the air and water allows most of, if not all of, the water to come into intimate contact with the oxygen in the air. This allows oxidation to take place much more rapidly than if the impure water was merely allowed to sit in a storage or holding tank with oxygen bubbled through it.

The intimate mixing of the water with the oxygen in the air causes a chemical reaction to take place which purifies the water. It is believed that the iron in the water combines with the oxygen to form iron oxide. The hydrogen sulfide in the water will react with the oxygen to form a hydrogen sulfate. Both the iron oxide and hydrogen sulfate are precipitates which can be filtered.

The water exits the mixing device 20 into another conduit 38 and is fed into a storage tank or separator tank 40. The tank 40 has a conventional green sand filter bed or other conventional filter medium. The water percolates through the filter bed and the precipitates are filtered out of the water. The purified water is then drawn for use.

Thus, there has been provided a method for removing dissolved impurities from water that fully satisfies the objects, aims and advantages set forth above. It is evident that many alternatives, modifications and variations will be apparent to those skilled in the art. Accordingly, it is intended to embrace all such variations as fall within the spirit and scope of the appended claims.

What is claimed is:

1. A method of removing dissolved iron or sulfur from water comprising the steps of:

pumping the water with the dissolved iron or sulfur through a conduit;

adding air to the water as it moves through the conduit; forcing the water and the added air into a closed container having a series of baffle plates therein;

the baffle plates defining a convoluted water passageway;

the series of baffle plates configured such that some of the baffle plates have openings therein and other baffle plates have an opening between their outer edge and the container defining a gap, the convoluted water passageway defined by the openings and gaps;

intimately and violently mixing the water and air using a high shear mixing action in the closed container;

chemically reacting the iron or sulfur with the oxygen in the air to form a filterable precipitate;

filtering the precipitate from the water in a filter medium;

drawing off the purified water for use.

2. The method of claim 1 wherein the intimate mixing occurs by breaking down the air in the water to air bubbles of less than 0.125 inches in diameter.

3. The method of claim 1 wherein the air is added to the water by an aerator.

4. The method of claim 1 wherein the filterable precipitate is either ferric oxide or hydrogen sulfate.

5. The method of claim 1 and the added step of allowing the water to Settle in a holding tank before drawing it for use.

6. A method for removing dissolved impurities from impure water comprising the steps of:

pumping the impure water into a conduit;

injecting air into the conduit containing the impure water the air forming bubbles in the impure water;

violently mixing the air and water using a high shear mixing action in a mixing device which breaks the air bubbles into bubbles having a diameter of less than 0.125 inches, the mixing device comprising a housing, an inlet and outlet with a plurality of baffle plates disposed therein, the baffle plates causing the water to change directions and increase its flow velocity as water passes through a gap defined by the baffle plate and the housing, the gap being less than 0.25 inches the increase in velocity and change of direction increasing the agitation and mixing of the water and air so that as the water leaves the mixing device it has air thoroughly mixed with it;

chemically reacting the air and impurities in the water to cause said impurities to form a substance that can be filtered from the water;

filtering the filterable substance from the water; and drawing off the purified water for use.

7. The method of claim 6 wherein the air is added to the water by an aerator.

8. The method of claim 6 wherein the impurities that can be filtered from the water are either ferric oxide or hydrogen sulfate.

9. The method of claim 6 and the added step of allowing the water to settle in a holding tank before drawing it for use.

* * * * *